United States Patent [19]

Jensen et al.

[11] 4,154,456
[45] May 15, 1979

[54] ARTICULATED VEHICLE WITH MOVABLE JOINT

[75] Inventors: Louis T. Jensen; Herman J. Maurer, both of Terre Haute, Ind.

[73] Assignee: J. I. Case Company, Racine, Wis.

[21] Appl. No.: 854,082

[22] Filed: Nov. 23, 1977

[51] Int. Cl.² ............................................... B60D 1/00
[52] U.S. Cl. .................................... 280/494; 280/400;
308/72
[58] Field of Search ................ 280/461 R, 400, 492, 280/494, 109; 180/134, 135, 136, 137, 138, 139, 51, 52; 308/72

[56] References Cited

U.S. PATENT DOCUMENTS

| 1,416,329 | 5/1922 | Blodgett | 180/50 |
| 3,912,300 | 10/1975 | Bryan | 280/400 |

FOREIGN PATENT DOCUMENTS 2547669  4/1977  Fed. Rep. of Germany ........... 280/492

Primary Examiner—Joseph F. Peters, Jr.
Assistant Examiner—R. Schrecengost
Attorney, Agent, or Firm—Dressler, Goldsmith, Clement, Gordon & Shore, Ltd.

[57] ABSTRACT

An articulated vehicle having two frame sections interconnected for pivotal movement about a vertical axis as well as a longitudinal axis is disclosed herein. The joint between the two frame sections includes upper and lower spaced pivotal connections between the two frame sections which define a vertical pivot axis and one of the pivotal connections is movable along a plane extending transversely of the frame sections to accommodate pivotal movement of the frame sections about a longitudinal axis.

10 Claims, 5 Drawing Figures

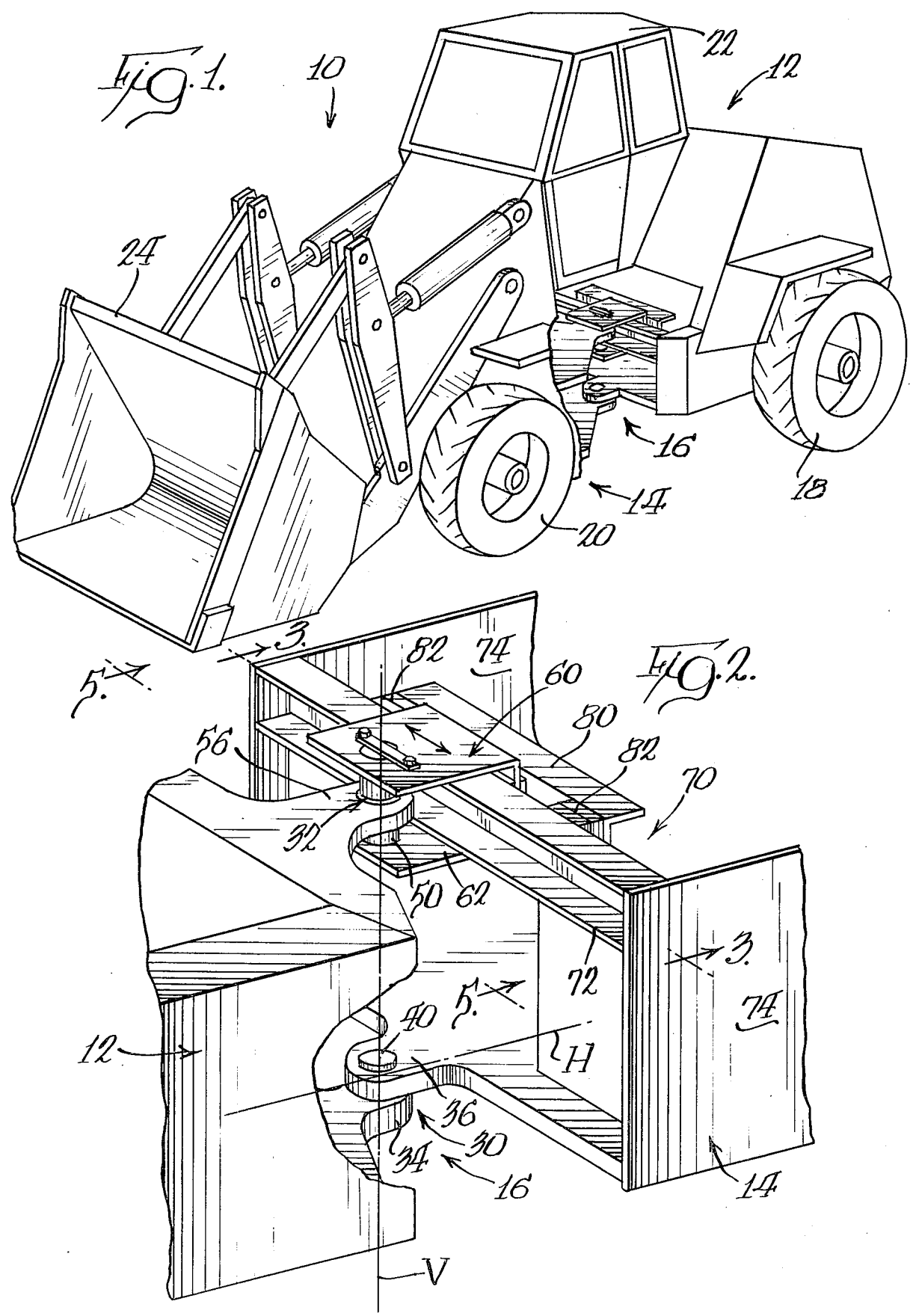

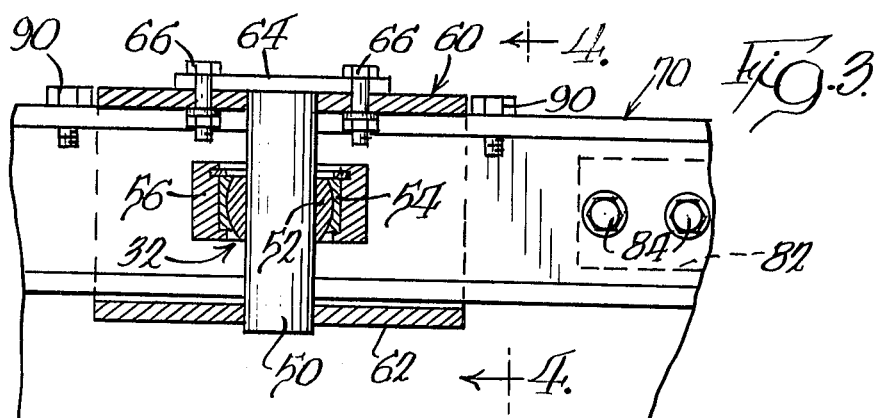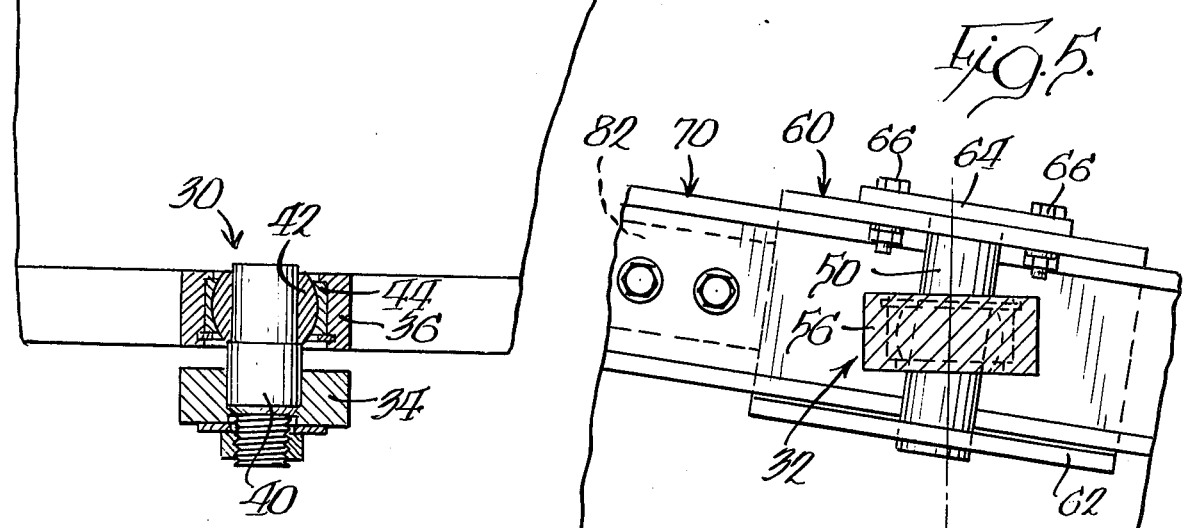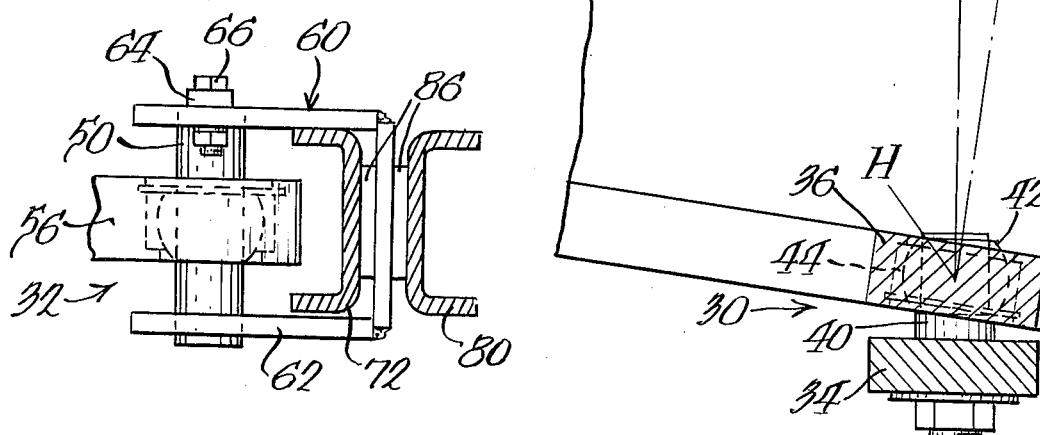

ARTICULATED VEHICLE WITH MOVABLE JOINT

BACKGROUND OF THE INVENTION

The present invention relates generally to articulated vehicles and more particulary to an articulated vehicle that has two frame sections, both of which have a pair of driven supporting wheels and a coupling or joint between the two frames to allow for relative rotation of the frames about both vertical and horizontal axes.

The recent trend in the design and construction of heavy earth moving equipment has utilized articulated vehicle sections that are pivotally interconnected and each section is supported by a pair of driven wheels. An articulated vehicle of this type is highly desirable since one section which houses the power plant can be a rather standard design and can be connected with a second section that supports the implement or tool and the tool supporting section is always properly oriented with respect to the direction of travel during earth working operations.

These particular vehicles are normally steered by interposing a drive means, such as a hydraulic fluid ram, between the two sections at a location spaced from the pivotal connection between the sections. Examples of this type of vehicle are shown in U.S. Pat. No. 3,038,619 and U.S. Pat. No. Re. 26,635. While these patents disclose a pivotal connection between the two frame sections, no provision is made for accommodating a change in angular position of the respective frame section with respect to each other in the longitudinal direction of travel. It will be appreciated that normally these types of vehicles are operated on extremely rough terrain and it is imperative that all four wheels remain in engagement with the ground at all times.

Thus, it has been proposed to provide a single center pivot articulated connection between the two frame sections that allows for pivotal movement of the frame sections along a vertical axis as well as along a generally horizontal longitudinal axis. Examples of this type of connection are shown in U.S. Pat. Nos. 3,299,982 and 3,521,719.

However, one problem encountered with a center joint connection between the respective frames is that a subframe is required to accommodate oscillation of the respective axles with respect to each other about a longitudinal axis. It has been found that such an approach has inherent disadvantages in that the center articulated joint requires extra mounting pivot points on the frames which results in a higher overall center of gravity for the unit to clear the various components which of necessity are incorporated into a vehicle of this type.

A further disadvantage of a single center joint connection between the frame sections is that it makes it more difficult for providing for the various connections of the components on the respective frame sections. For example, normally these units have a power plant located on one of the frame sections and have the material handling unit on the other frame section. Since most of the control functions are, of necessity, located on the frame section with the material handling unit thereon, provision must be made for interconnecting the power plant with the various components on the other section which is normally accomplished through hydraulic plumbing and electrical wiring. Also, since all four wheels are driven it is necessary to provide a driving connection between the two sections, which is usually done with a drive shaft. With a center articulated joint, it becomes difficult to find adequate space for passing the drive shaft through the connection between the frame sections.

SUMMARY OF THE INVENTION

According to the present invention, a unique interconnection or joint between two articulated frame sections is provided which incorporates two spaced pivotal connections between the frame sections that can be spaced any desired dimension to reduce the bearing load on the respective pivotal connections. One of the pivotal connections is movable transversely of the longitudinal axis of the vehicle to allow for oscillation of the vehicle about a horizontal longitudinally axis. The spaced apart pivotal connections leave the center joint area between the frame sections clear of any components so that the drive axle between the two components can pass through the center between the two sections. Adequate space is available along the center portion of the two sections to interconnect the various components, such as the hydraulic components on the respective sections.

More specifically, the articulated vehicle of the present invention includes first and second frames that are interconnected for movement about both a vertical axis and a horizontal axis extending generally longitudinally of the vehicle through a novel joint or coupling. The joint or coupling includes a pair of spaced pivotal connections interconnecting the respective frames for pivotal movement about one of the two axes and at least one of the pivotal connections is movable along a plane extending through the first pivot axis to accommodate oscillation of the frame sections about a generally longitudinally horizontal axis.

In the specific embodiment of the invention, one of the sections has an elongated guide rail that extends generally transversely of the longitudinal axis thereof with a support member movable along the guide rail. A first universal connection is provided between the support member and the other frame section while a second universal connection is provided directly between the two frame sections at a location spaced from the guide rail. Thus, the second universal connection not only provides a connection between the two frame sections that will accommodate pivotal movement about the first vertical axis but also defines a generally horizontal longitudinal pivot axis between the frame sections.

BRIEF DESCRIPTION OF THE DRAWINGS

FIG. 1 clearly shows an articulated vehicle having the coupling or joint of the present invention incorporated therein;

FIG. 2 is an enlarged fragmentary perspective view of the joint or coupling;

FIG. 3 is an enlarged cross-sectional view, as viewed along line 3—3 of FIG. 2;

FIG. 4 is a fragmentary cross-sectional view, as viewed along line 4—4 of FIG. 3;

FIG. 5 is a fragmentary cross-sectional view, as viewed generally along line 5—5 of FIG. 2.

DETAILED DESCRIPTION OF THE DRAWINGS

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiment illustrated.

FIG. 1 of the drawings generally discloses an articulated vehicle, indicated by the reference numeral 10, having a rear frame 12 and a front frame 14. Front and rear frames or sections 12 and 14 are interconnected by a coupling or joint, generally indicated by reference numeral 16. Rear section or frame 12 is supported by a pair of rear wheels 18 which are attached to opposite ends of an axle (not shown) that is fixed to the frame section. The rear section preferably incorporates the propulsion unit or engine (not shown) for propelling the vehicle. Front frame 14 is likewise supported on a pair of wheels 20 (only one being shown) and has an operator's cab 22 supported thereon. A material handling unit 24 is pivotally supported on the forward end of front frame 14 in a well-known manner and thus, a detailed description thereof does not appear to be necessary.

According to the present invention, coupling or joint 16 is constructed in a fashion to accommodate articulation of the frame sections about a vertical axis as well as oscillation of the frame sections about a generally longitudinally horizontal axis. For this purpose, joint 16 includes first and second spaced pivotal connections 30 and 32 which pivotally interconnect the sections for pivotal movement about one axis, a vertical axis V, illustrated in FIG. 5.

The first or lower pivotal connection 30 defines a universal connection between the two frame sections and is most clearly illustrated in FIGS. 3 and 5. Pivotal connection 30 includes a pair of ears 34 and 36 which are respectively integral with a respective frame section and are in overlapping relation to each other. Ear 34 supports a fixed pin 40 which extends upwardly and has a spherical ball 42 supported on the reduced upper end thereof. Ball 42 cooperates with a spherical socket 44 which is fixedly secured within an opening in ear 36 on the other frame section.

The second or upper pivotal connection between the two frames is similar in construction to lower pivotal connection 30 and again includes a fixed pin 50 that has a spherical ball 52 supported intermediate opposite ends thereof and received into a socket 54 which is supported upon an ear 56 defined on rear frame section 12. Spherical ball 52 is movable axially along pin 50, for a purpose that will be described later.

According to the primary aspect of the present invention, universal connection 32 is adapted to be moved transversely of the vehicle to accommodate pivotal movement of frames 12 and 14 about a generally longitudinal horizontal axis. For this purpose, pin 50 is supported on a support member or element 60 which is supported for movement transversely of the longitudinal axis for vehicle 10. In the illustrated embodiment, element or support member 60 consists of a U-shaped bracket 62 with pin 50 extending between the two legs of bracket 62, as more clearly illustrated in FIG. 4. Pin 50 may be releasably retained on bracket 62 through a plate 64 integral with pin 50 and releasably retained on bracket 62 through bolts 66.

Support member or guide element 60 is guided for movement along a path through guide means 70 which is illustrated as an elongated generally horizontal guide rail 72 that may be channel shaped in cross-section as illustrated in FIG. 4. Guide rail or channel 72 extends between a pair of vertical plates 74 (FIG. 2) that form part of front frame 14 and rail 72 extends transversely of the longitudinal axis of the vehicle when the vehicle is traveling in a straight ahead direction.

Retainer means cooperate with guide rail 72 to maintain support member or guide element 60 on guide rail 72 and also define extreme limits of movement of support member 60 along guide rail 72. For this purpose, as illustrated in FIG. 2, a second channel member or retainer means 80 extends parallel to and is slightly spaced from channel 72. Spacers 82 are positioned between channels 72 and 80 at opposite ends and channels 72, 80 and spacers 82 are interconnected by bolts 84 (FIG. 5). Therefore, spacers 82 not only maintain a predetermined clearance between channels 72 and 80 but also define extreme limits of movement of support member 60 along guide rail 72. Preferably, suitable wear plates 86 are secured to opposite surfaces of the base portion of U-shaped bracket 62 and are in contiguous engagement with the adjacent surfaces of channels or rails 72 and 80.

According to a further aspect of the present invention, support member 60 may readily be locked in a fixed position with respect to guide means 70. This feature is of significant importance for the overall acceptability of the coupling constructed in accordance with the present invention. It will be appreciated that in some instances it may be desirable to prevent any oscillation of the respective frames 12 and 14 about a longitudinal axis with respect to each other. For example, when the vehicle is being transported along highways it is desirable to have the sections pivoted about only a vertical axis to increase the stability of the vehicle operating at high speeds. As illustrated in FIG. 3 only, the lock means may be in the form of bolts 90 which extend through an upper leg of rail 70 on opposite sides of support member 60 to prevent any transverse movement of support member 60 along guide rail 72. With the lock means 90 in position, the pivotal movement of the respective frame sections relative to each other is limited to pivotal movement about vertical axis V.

It will be appreciated from the above description that the present invention provides a unique simple arrangement for interconnecting two frame sections for articulation as well as oscillation. During articulation of the frame sections relative to each other, through actuation of a fluid ram (not shown) between the frame sections, the pivotal movement of the frame sections will be about vertical axis V which is defined by the two pins 40 and 50 that are vertically aligned, as illustrated in FIG. 3. However, if one of the frame sections travels over uneven terrain, the frame sections can be readily pivoted about a longitudinal axis to accommodate this pivotal movement. Thus, as illustrated in FIG. 5, if front frame 14 is pivoted in a slightly clockwise direction, front frame 14 and rail 72 will pivot about a horizontal pivot axis H defined within lower pivotal connection 30. During this pivotal movement, support member or guide element 60 is moved along rail 72 and spherical ball 52 is moved axially with respect to pin 50 so that the front frame section can be moved to the angular position illustrated in FIG. 5 while the rear frame section remains in a generally horizontal position. Of course, the extreme limits of movement of support member 60 with respect to guid means or rail 70 are defined by spacers 82, illustrated in FIG. 2.

From the above description it will be apparent that the present invention provides an extremely low cost joint between two articulated vehicle sections that can accommodate pivotal movement about two perpendicular axes and the respective two pivotal connections 30 and 32 can be vertically spaced any desired distance to provide a large open area along the center longitudinal axis of the vehicle and, to reduce the bearing load for each pivotal connection. This large open area can be utilized for extending a drive axle between the two frame sections so that the front wheels can readily be driven from the power plant located in the rear section. Furthermore, the large open space can also be utilized for passing hydraulic and electrical connections from one section to another and again these connections can pass through approximately the longitudinal horizontal pivot axis between the two sections so as to eliminate the need for complicated fittings that normally are required for making such connections between the respective sections.

What is claimed is:

1. An articulated vehicle comprising a wheel supported front section, a wheel supported rear section and a joint between said sections accommodating relative pivotal movement of said sections in a horizontal plane about a vertical axis and a vertical plane about a horizontal axis, the improvement of said joint including spaced pivotal connections interconnecting said sections for pivotal movement about one of said axes, an elongated guide rail on one of said sections with one of said pivotal connections movable along said guide rail and in which the other of said pivotal connections defines a universal connection between said sections.

2. An articulated vehicle including first and second frames interconnected for movement about both a vertical axis and a horizontal axis extending generally longitudinally of the vehicle, characterized by an elongated guide rail on one of said frames, a support member movable along said guide rail, first means defining a first universal connection between said support member and the other of said frames, and second means spaced from said rail defining a second universal connection between said frames.

3. An articulated vehicle as defined in claim 2, further including retainer means maintaining said support member on said guide rail and defining extreme limits of movement of said support member along said guide rail.

4. An articulated vehicle as defined in claim 3, in which each universal connection includes a fixed pin supporting a spherical ball and a spherical socket receiving said ball.

5. An articulated vehicle as defined in claim 4, in which said spherical ball of said first universal connection is axially shiftable on its supporting pin.

6. An articulated vehicle as defined in claim 2, further including lock means for locking said support member on said guide rail to prevent pivotal movement of said frames about said horizontal axis.

7. An articulated vehicle comprising a wheel supported front section, a wheel supported rear section and a joint between said sections accommodating relative pivotal movement of said sections in a horizontal plane about a vertical axis and in a vertical plane about a horizontal axis, the improvement of said joint including spaced pivotal connections interconnecting said sections for pivotal movement about said vertical axis, guide means on one of said sections, and one pivotal connection including an element movable along said guide means with a pin fixed to said element and a universal connection on the other of said sections receiving and supporting said pin and accommodating movement of at least one of said pivotal connections along a plane extending through said vertical axis for pivotal movement of said sections about said horizontal axis.

8. An articulated vehicle as defined in claim 7, in which the other pivotal connection includes a second pin fixed to said other of said sections and a universal connection on said one of said sections receiving said second pin.

9. An articulated vehicle comprising a wheel supported front section, a wheel supported rear section and a joint between said sections accommodating relative pivotal movement of said sections in a horizontal plane about a vertical axis and in a vertical plane about a horizontal axis, the improvement of said joint including spaced pivotal connections interconnecting said sections for pivotal movement about one of said axes, and means accommodating movement of at least one of said pivotal connections along a plane extending through said one of said axes for pivotal movement of said sections about the other of said axes, said means including a generally horizontal rail on one of said sections with said at least one of said pivotal connections supported for movement along said horizontal rail and in which the other of said pivotal connections provides a universal connection between said sections.

10. An articulated vehicle as defined in claim 9, further including stop means along said rail limiting the extent of movement of said at least one of said pivotal connections along said rail.

* * * * *